(12) United States Patent
Zheng et al.

(10) Patent No.: US 8,142,213 B2
(45) Date of Patent: Mar. 27, 2012

(54) CONNECTOR

(75) Inventors: Song Zheng, Yokkaichi (JP); Takatoshi Katsuma, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 12/981,594

(22) Filed: Dec. 30, 2010

(65) Prior Publication Data

US 2011/0170947 A1    Jul. 14, 2011

(30) Foreign Application Priority Data

Jan. 8, 2010    (JP) ................................. 2010-002671

(51) Int. Cl.
*H01R 13/62*    (2006.01)
(52) U.S. Cl. .......................... 439/157; 439/701; 439/272
(58) Field of Classification Search .................. 439/157, 439/272, 701, 707, 712, 713
See application file for complete search history.

(56) References Cited

U.S. PATENT DOCUMENTS 5,855,486 A    1/1999    Fukamachi et al.

*Primary Examiner* — Tulsidas C Patel
*Assistant Examiner* — Travis Chambers
(74) *Attorney, Agent, or Firm* — Gerald E. Hespos; Michael J. Porco

(57) ABSTRACT

A connector which can avoid lowering of a waterproof performance between a frame and a sub-housing. First and second housings are engaged by rotating a lever mounted on the first housing. The second housing has a second frame and second sub-housings are accommodated in accommodating spaces formed in the second frame. A cam follower is formed on an outer surface of a dual-purpose outer wall that faces the accommodating space out of the second frame. A seal is provided between an outer periphery of the second sub-housing and an inner periphery of the accommodating space. A frame-shaped restricting member is assembled to the second frame and surrounds the second frame to restrict outward displacement of the dual-purpose wall.

16 Claims, 12 Drawing Sheets

CONNECTOR

BACKGROUND OF THE INVENTION

1. Field of the Invention

The invention relates to a split-type lever connector having a waterproof function.

2. Description of the Related Art

U.S. Pat. No. 5,855,486 discloses a split-type lever connector. The connector includes: a first housing; a lever rotatably mounted on the first housing; and a second housing that is engageable with the first housing by fitting engagement. The second housing has a synthetic resin frame formed with accommodating spaces and sub-housings are accommodated in the accommodating spaces. A cam follower projects from an outer surface of a dual-purpose outer wall of the frame that faces the accommodating space.

The lever has a cam that engages the cam follower when the first and second housings are fit slightly together. The lever then is rotated so that the cam and the cam follower generate a cam action (toggle action) that urges the housings into fitting engagement.

A ring-shaped sealing member has been considered for disposition between an outer periphery of the sub-housing and an inner periphery of the accommodating space to fulfill a waterproof function for the above-described connector. However, there exists a possibility that the cam follower will be pulled toward the cam during rotation of the lever due to the fitting engagement resistance between the housings. Thus, the dual-purpose wall portion on which the cam follower is formed may displace toward an outer surface side due to this pulling force. As a result, a waterproof performance between the sealing member and an inner surface of the dual-purpose wall is lowered.

The present invention has been made under such circumstances, and an object of the invention is to provide a connector that can avoid lowering a waterproof performance between a frame and a sub-housing.

SUMMARY OF THE INVENTION

The invention relates to a connector with a first housing. A lever is mounted rotatably on the first housing and has a cam. The connector also has a second housing that is engageable with the first housing by fitting engagement. The second housing a frame made of a synthetic resin and accommodating spaces are formed inside the frame. The second housing also has sub-housings accommodated in the accommodating spaces. A cam follower projects on an outer surface of a dual-purpose outer wall of the frame that faces the accommodating spaces. A ring-shaped seal is provided between an outer periphery of the sub-housing and an inner periphery of the accommodating space. The first and second housings are fit slightly together so that the cam and the cam follower engage. The lever then is rotated and the first and second housings are brought into engagement with each other due to a cam action between the cam and the cam follower. A frame-shaped restricting member is assembled to the frame. The frame-shaped restricting member surrounds the frame and restricts outward displacement of the dual-purpose wall.

A force may attempt to expand and displace the dual-purpose wall outwardly due to the fitting engagement resistance between the housings as the lever is rotated. However, the frame-shaped restricting member surrounds the frame including the dual-purpose wall, thereby restricting expansion and displacement of the dual-purpose wall. Accordingly, the waterproof performance between the seal and the inner surface of the dual-purpose wall is not lowered.

An expansion restricting wall preferably is formed on the first housing and is configured to restrict outward displacement of the lever. Thus, the expansion restricting wall further restricts outward displacement of the dual-purpose wall.

A reinforcement preferably is formed on the restricting member and is configured to project in the circumferential direction. The reinforcement strengthens the restricting member and further resists deformation of the restricting member. Accordingly, outward displacement of the dual-purpose wall is prevented even more assuredly.

Any outward displacement of the dual-purpose wall that may occur will have a maximum at the opening periphery of the frame. Accordingly the restricting member preferably is arranged at an opening end of the frame when the restricting member is assembled to the frame for further preventing displacement of the dual-purpose wall.

A removal preventing portion preferably is formed on the restricting member and is configured to engage the sub-housing in the accommodating space and to restrict removal of the sub-housing from the accommodating space.

DETAILED DESCRIPTION OF THE PREFERRED EMBODIMENT

Figure 1:
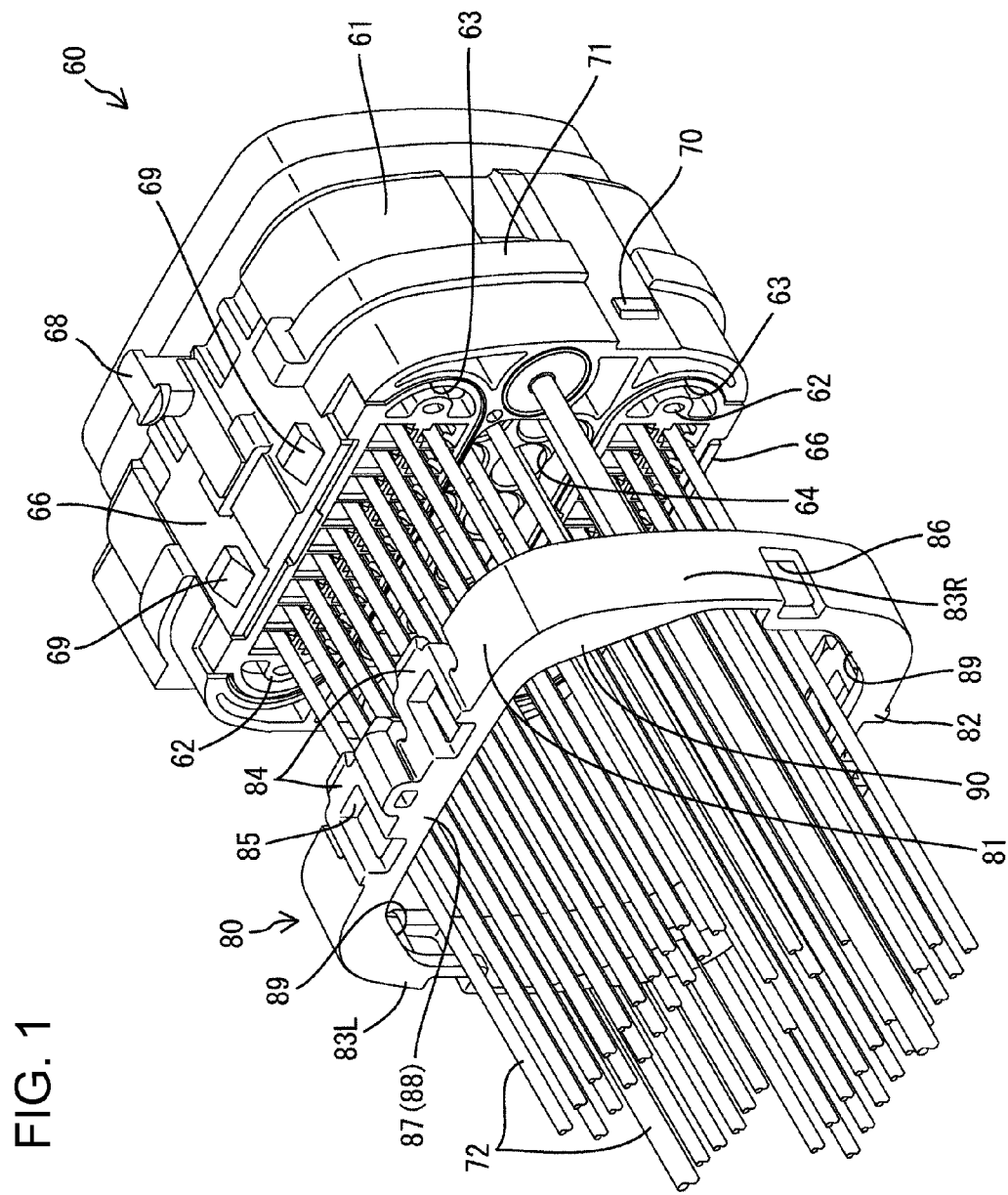
FIG. 1 is a perspective view showing a restricting member removed from a second housing.
Figure 2:
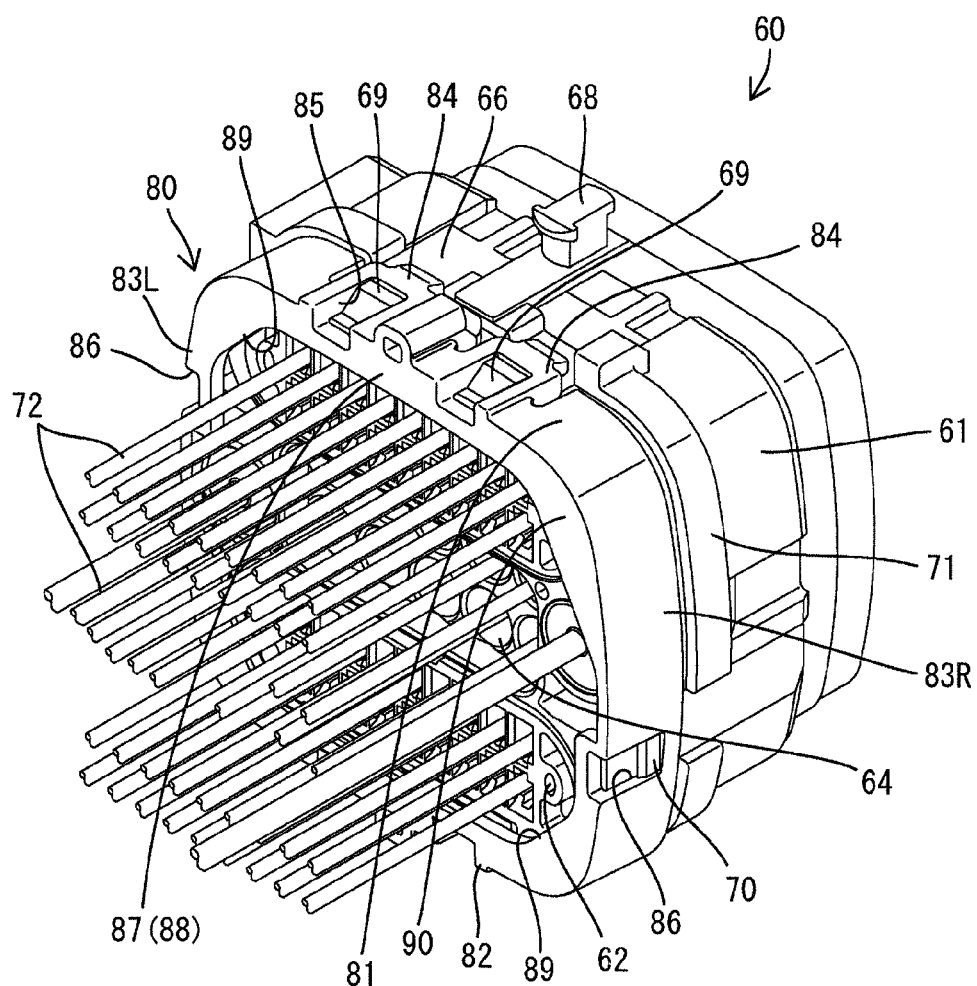
FIG. 2 is a perspective view showing the restricting member assembled to the second housing.
Figure 3:
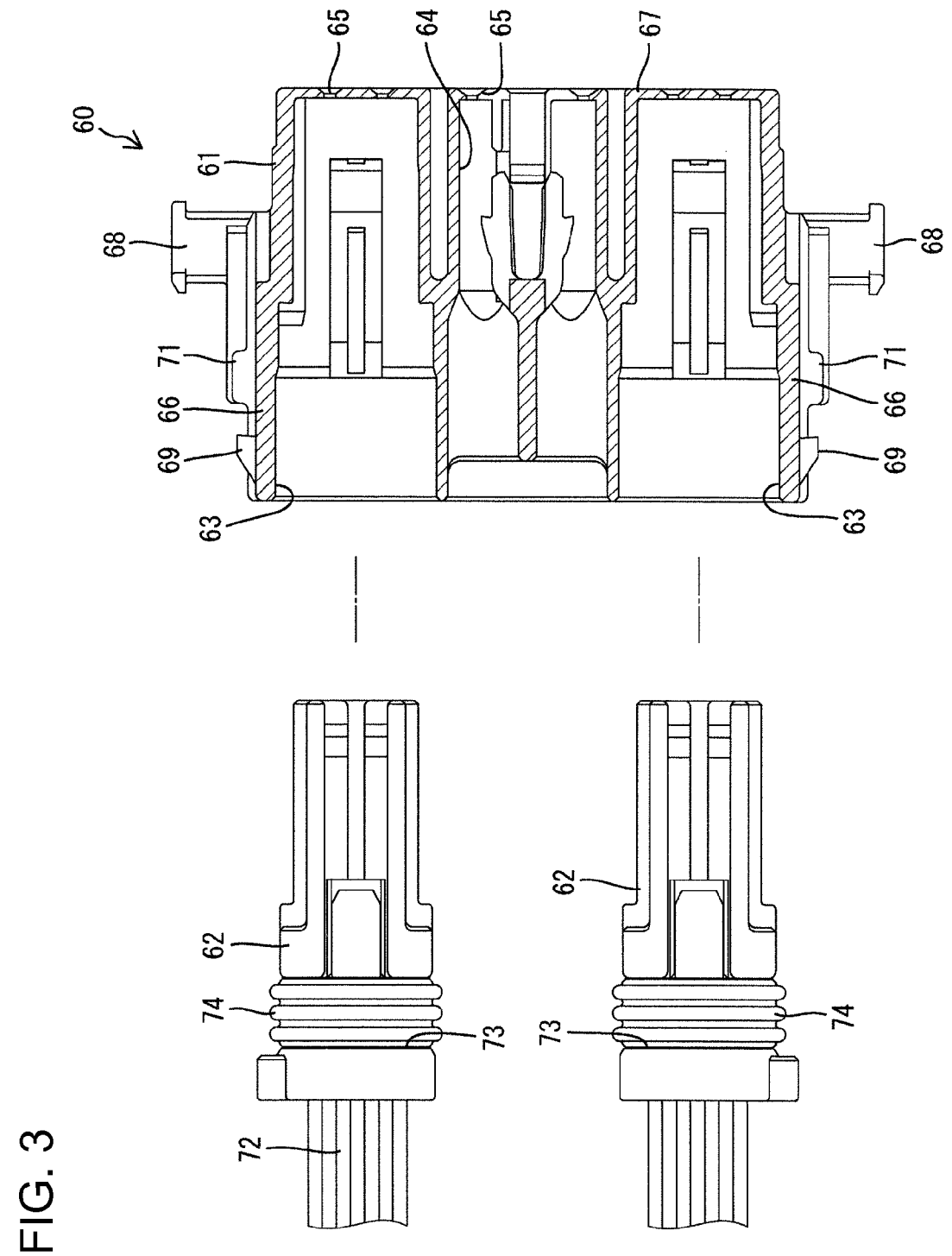
FIG. 3 is a cross-sectional view showing a second sub-housing is removed from a second frame.
Figure 4:
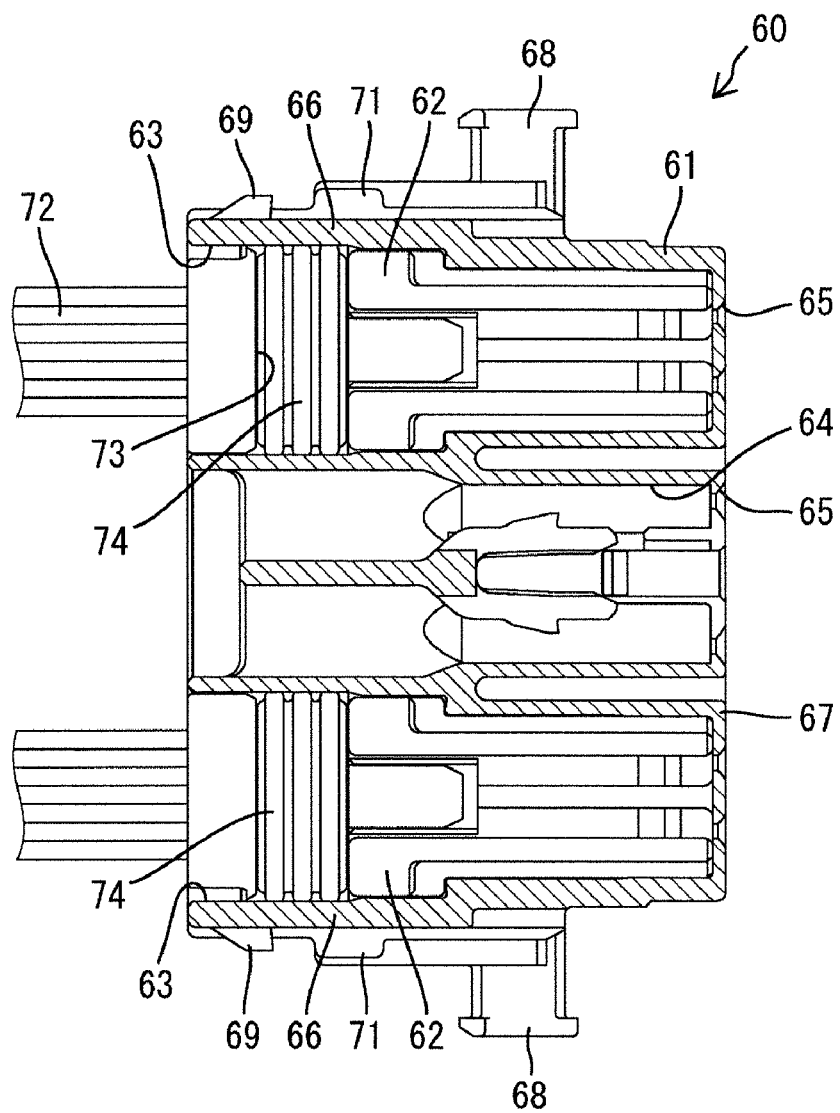
FIG. 4 is a cross-sectional view showing the second sub-housing assembled to the second frame.
Figure 5:
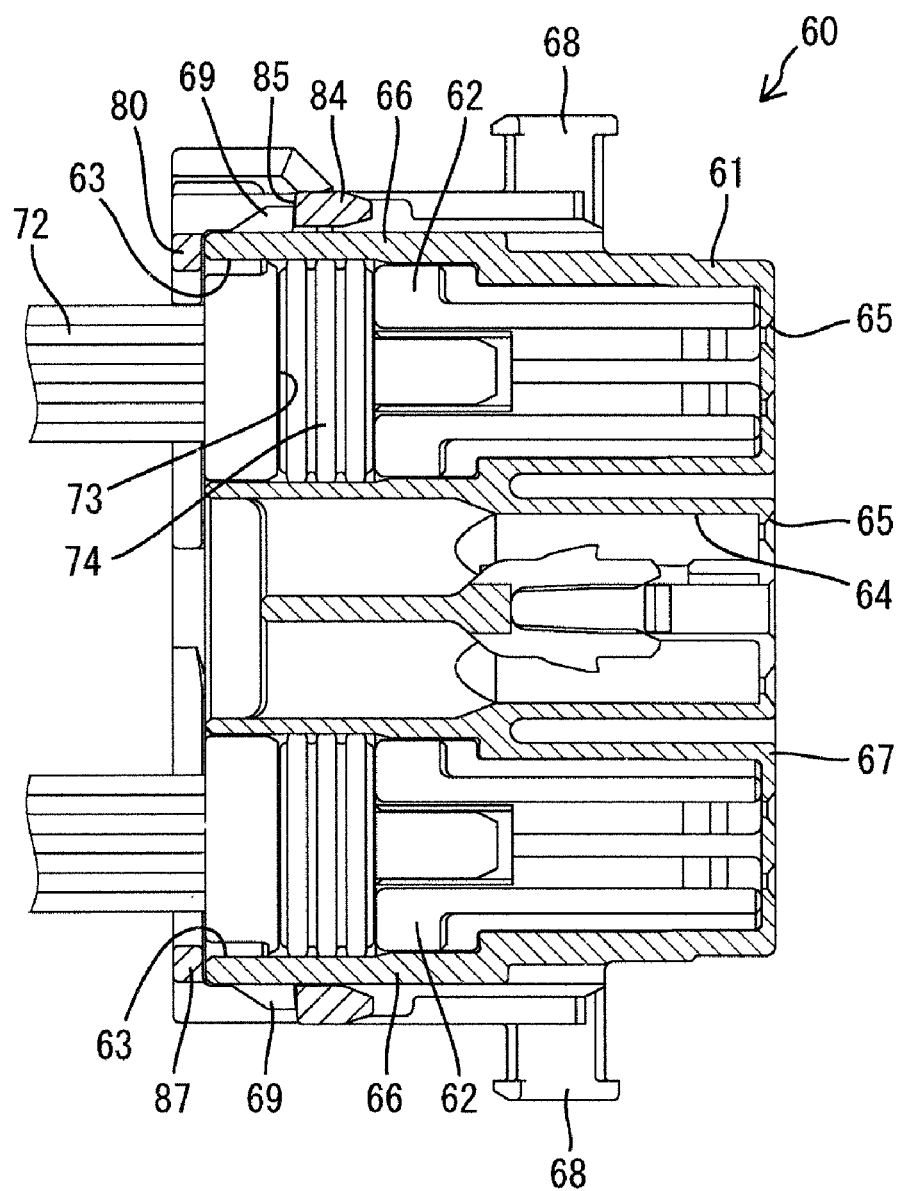
FIG. 5 is a cross-sectional view showing the second sub-housing and the restricting member assembled to the second frame.
Figure 6:
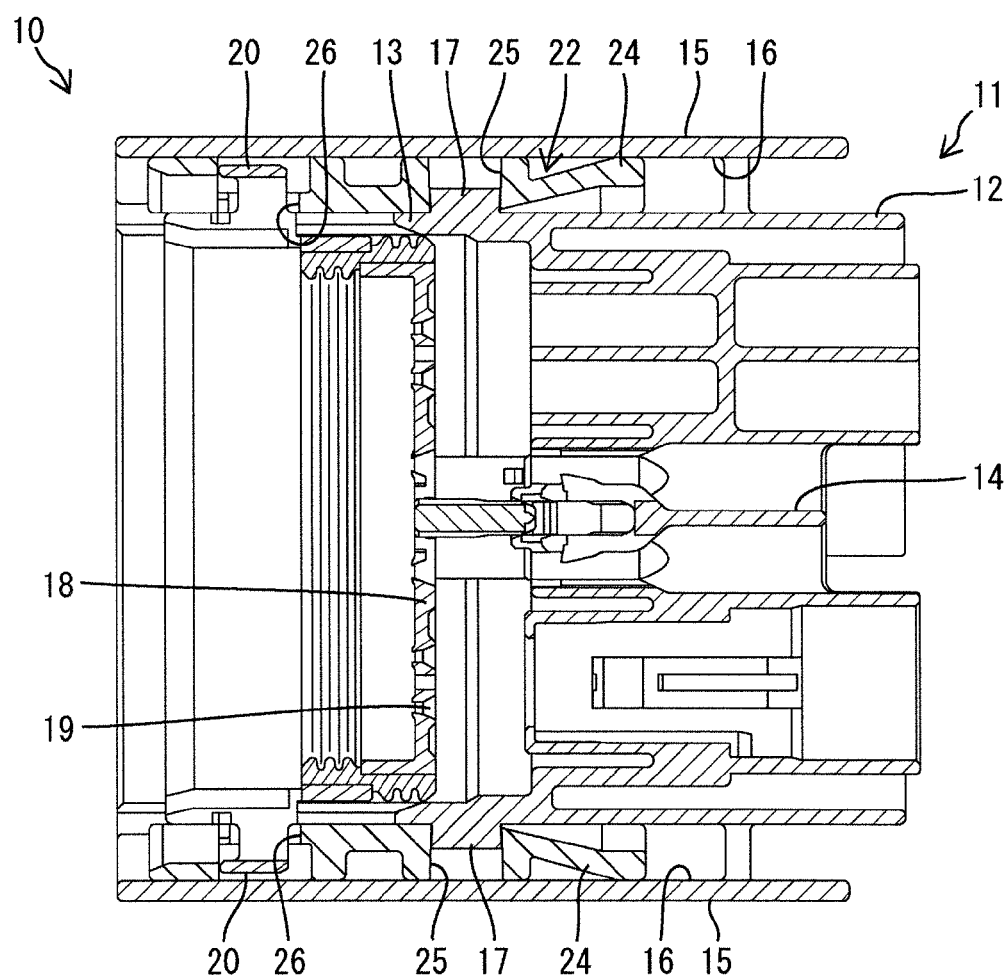
FIG. 6 is a cross-sectional view of a first housing.
Figure 9:
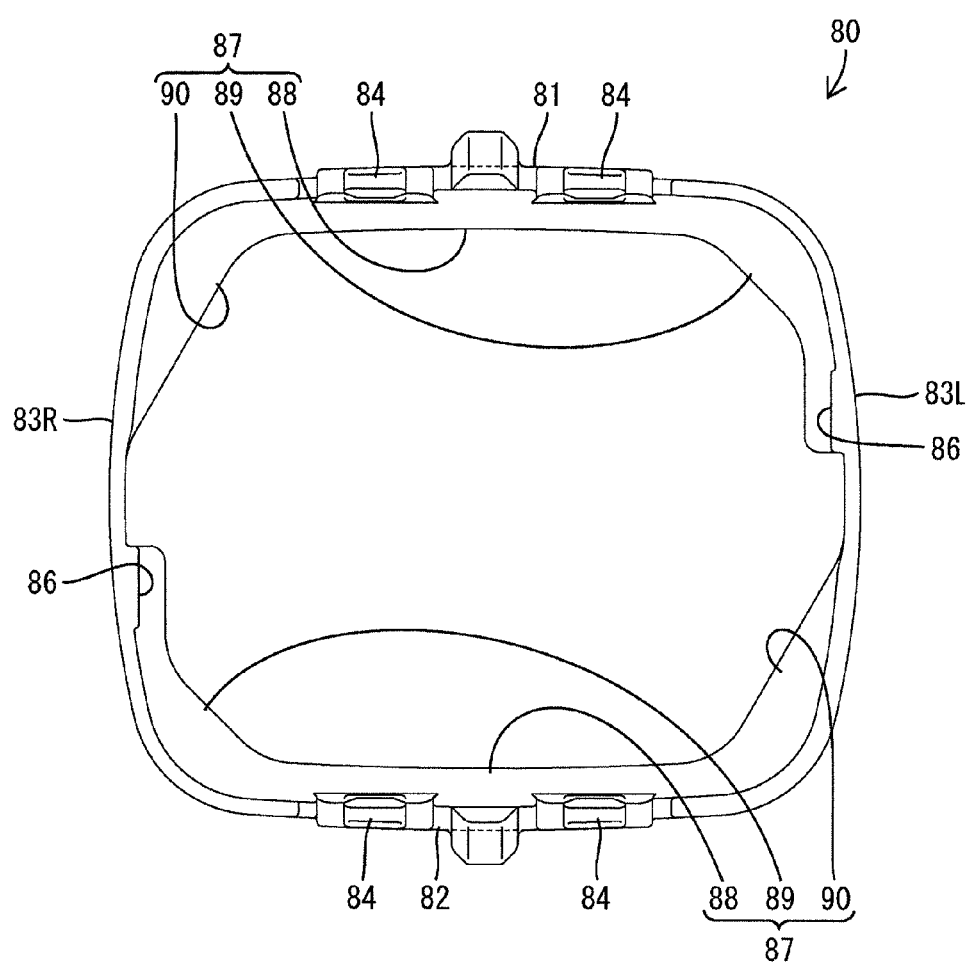
FIG. 9 is a front view of the restricting member.
Figure 10:
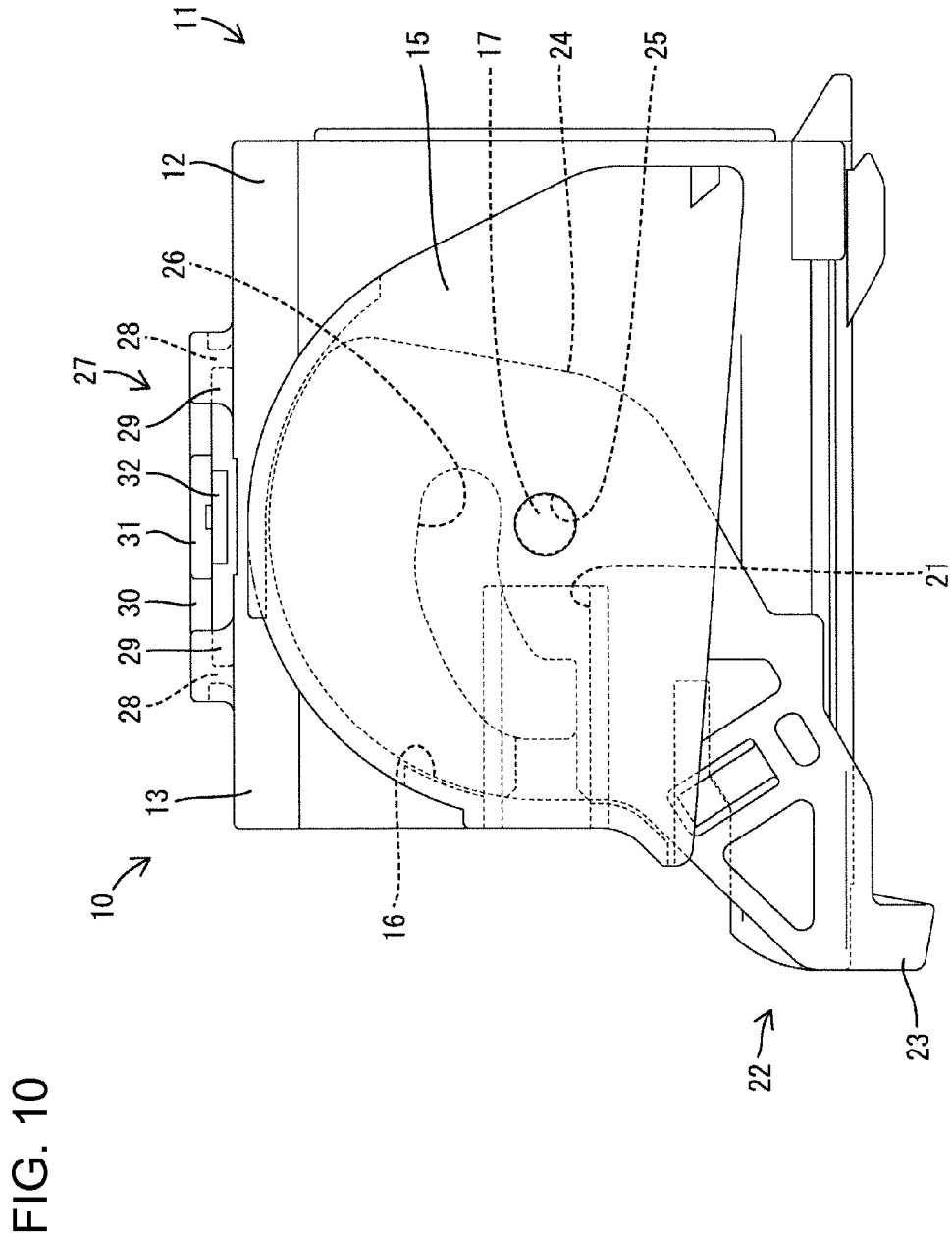
FIG. 10 is a plan view of the first housing.
Figure 11:
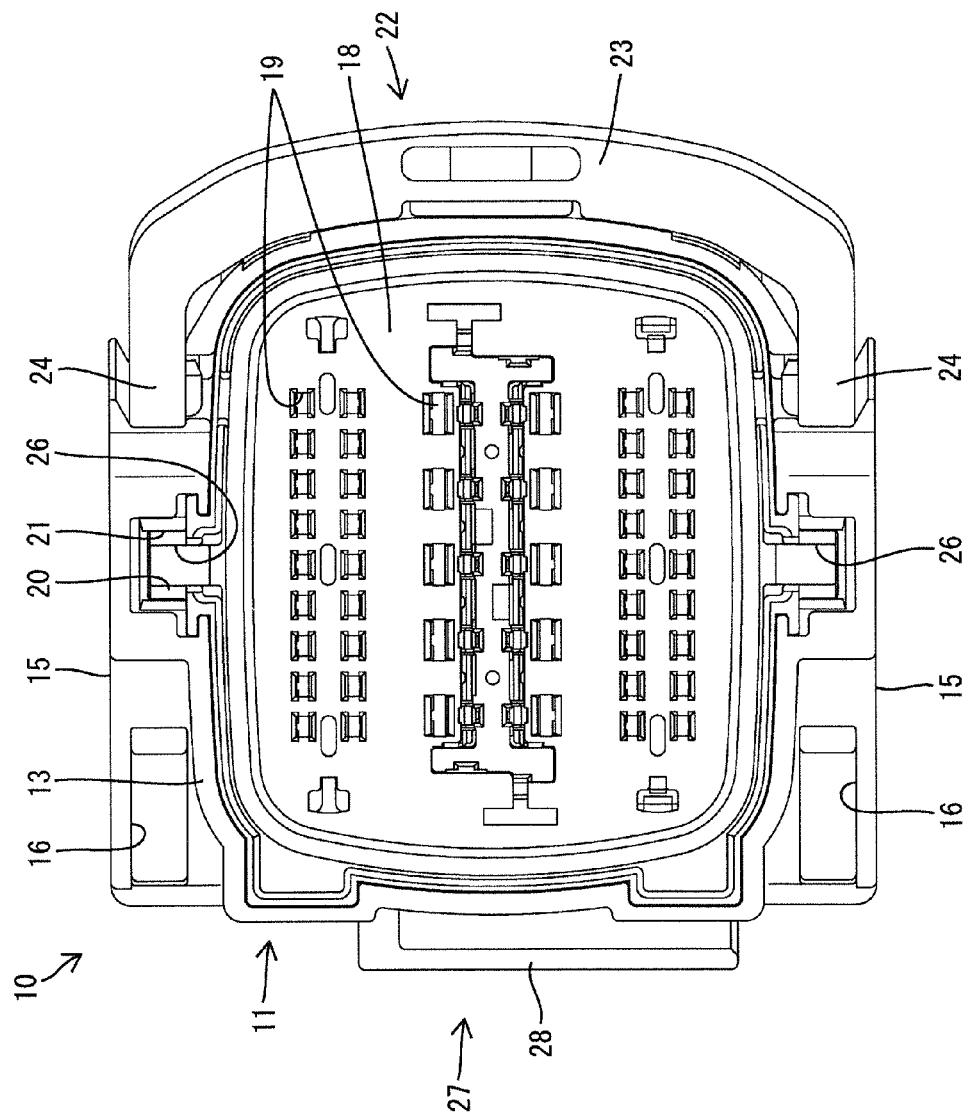
FIG. 11 is a front view of the first housing.

A connector in accordance with the invention is explained in conjunction with FIG. 1 to FIG. 12. The connector has a split-type first housing 10 and a split-type second housing 60 engaged with each other by fitting engagement using a lever 22, and the connector possesses a waterproof performance. As shown in FIG. 6, FIG. 10 and FIG. 11, the first housing 10 has a synthetic resin first frame 11. The first housing also has male terminal fittings (not shown) of having different sizes, and upper and lower first sub-housings (not shown).

Figure 7:
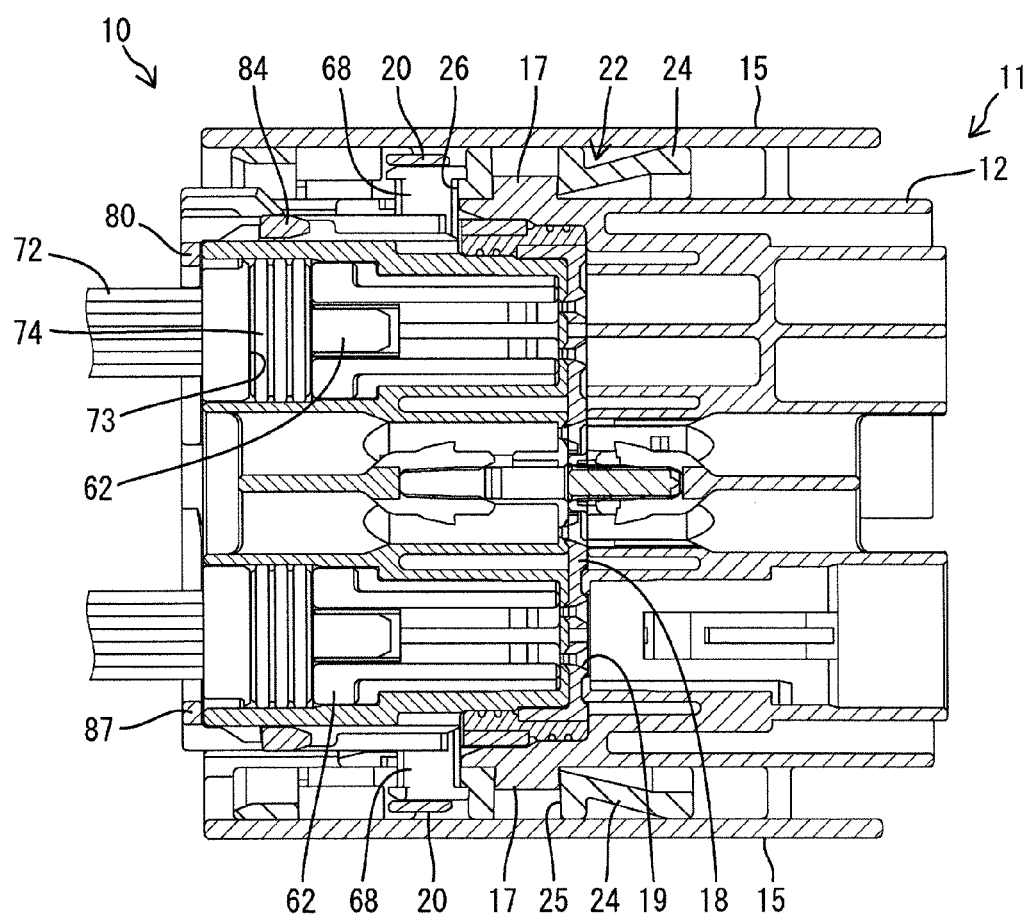
FIG. 7 is a cross-sectional view showing the first and second housings normally engaged with each other by fitting engagement.
Figure 8:
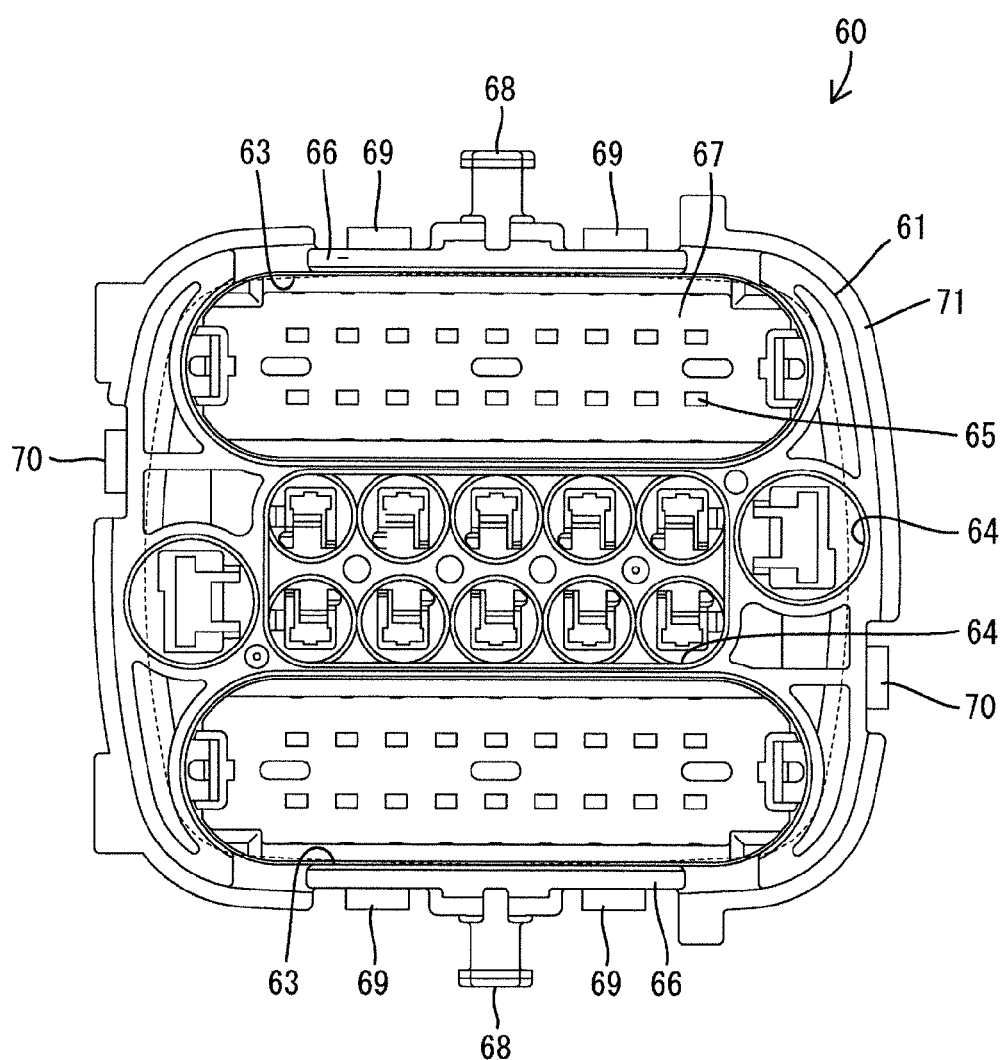
FIG. 8 is a back view of the second frame.

The first frame 11 has an integral body with a block-shaped terminal holding portion 12 and an approximately quadrangular tubular hood 13 that projects frontward from an outer periphery of a front end portion of the terminal holding portion 12 (left side in FIG. 6 and FIG. 7). Each male terminal fitting has a well-known configuration with an elongated tab that extends frontward from a body. The body of each male terminal fitting is accommodated inside the first sub-housing, and the first sub-housing is accommodated in the terminal holding portion 12. First cavities 14 are formed inside of the terminal holding portion 12, and the body of each male terminal fitting is inserted into a respective first cavity 14. A tab of each male terminal fitting projects frontward from a front surface of the terminal holding portion 12 and is surrounded by the hood 13. The male terminal fittings are arranged in point symmetry in the first housing 10 with respect to an axis of symmetry (not shown) in the fitting engagement direction (longitudinal direction) of both housings 10, 60.

Two expansion restricting walls 15 are formed integrally on the hood 13 in spaced facing relationship to outer surfaces of upper and lower walls of the hood 13. Rotation spaces 16 for rotatably accommodating arms 24 of the lever 22 are formed between the upper surface of the hood 13 and the upper expansion restricting wall 15 and between the lower surface of the hood 13 and the lower expansion restricting wall 15. A support shaft 17 is formed in each rotation space 16 and projects out from the upper and lower surfaces of the hood 13 to define a vertical axis.

A moving plate 18 is disposed in the hood 13, as shown in FIGS. 6, 7 and 11, and has positioning holes 19 that allow penetration of the respective tabs. The moving plate 18 is movable in the longitudinal direction, which is parallel to the fitting engagement direction of the first and second housings 10 and 60. A peripheral wall projects forward on an outer peripheral edge of the moving plate 18. Connections 20 project out from upper and lower panels of the peripheral wall and cutaways 21 are formed on the hood 13 for avoiding interference between the hood 13 and the connections 20.

The lever 22 is made unitarily of a synthetic resin and includes a manipulation part 23 and two plate-shaped symmetrical arms 24 that extend parallel to each other from upper and lower ends of the manipulation part 23. A bearing hole 25 and an arcuate cam groove 26 are formed on each arm portion 24. The lever 22 is mounted on the first housing 10 for rotation between an initial position (see FIGS. 10 and 11) and a fitting engagement position (see FIG. 7) in a state where the arms 24 are accommodated in the rotation spaces 16 and the support shafts 17 are fit into the bearing holes 25. The manipulation part 23 is displaced longitudinally along a left outer surface of the first frame 11 in a process of rotating the lever 22.

Figure 12:
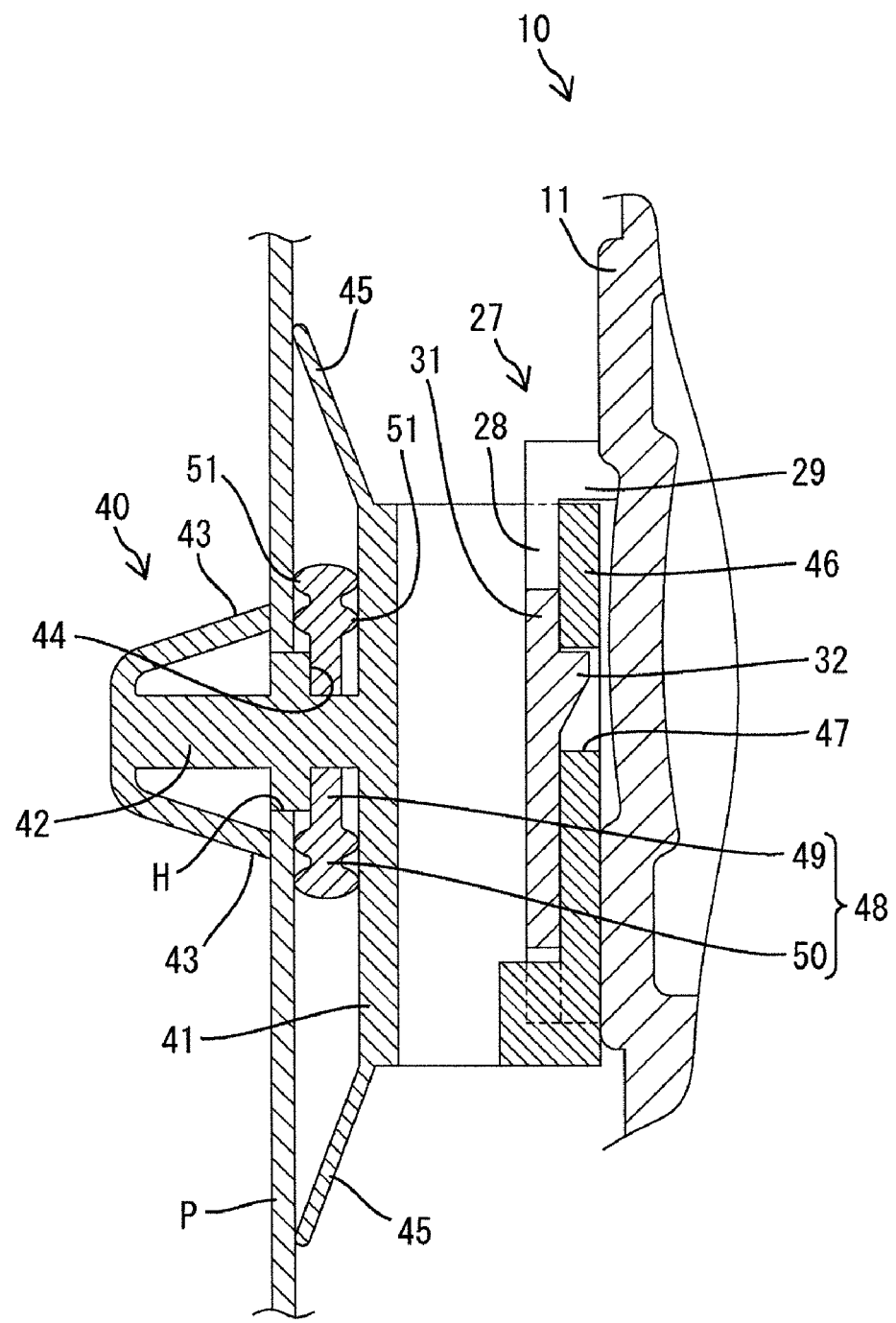
FIG. 12 is a cross-sectional view showing the first housing mounted on a panel by a clip.

A mounting portion 27 is formed on a right outer surface of the first frame 11 (a side that does not correspond to the manipulation part 23) for engaging the first frame 11 with a clip 40, as shown in FIGS. 10 to 12. The mounting portion 27 is formed integrally with front and rear guide ribs 28 that project vertically from an outer surface of the first frame 11. Stoppers 29 are formed on upper ends of the guide ribs 28 and a bridge 30 extends between the guide ribs 28. A lock arm 31 is cantilevered up from the bridge 30 and is elastically deflectable away from a right side surface of the first frame 11. A projecting-shaped lock portion 32 is formed on the lock arm 31 and projects toward a right side surface of the first frame 11.

The clip 40 is made of a synthetic resin. As shown in FIG. 12, the clip 40 is mounted on a panel P formed with a mounting hole H. The clip 40 has a base 41 and a shaft 42 projects leftward from the base 41. Upper and lower elastic engaging members 43 are cantilevered rightward from a left distal end of the shaft 42 in obliquely upward and oblique downward directions respectively. A mounting groove 44 is formed on an outer periphery of a proximal portion of the shaft 42. Upper and lower elastic pushing members 45 are cantilevered obliquely leftward from upper and lower ends of the base 41. An engaging plate 46 extends up along a right side surface of the base 41, and a through hole 47 laterally penetrates the engaging portion 46.

A rubber seal ring 48 is mounted on the mounting groove 44. The seal ring 48 is formed integrally to define a ring body 49 that is fit in the mounting groove 44 and a seal functioning part 50 on an outer periphery of the ring body 49. Lips 51 project from left and right surfaces of the seal functioning part 50.

The clip 40 is assembled to the mounting portion 27 of the first frame 11 from below by inserting the engaging portion 46 into a gap between the lock arm 31 and the first frame 11. An upper end of the engaging portion 46 interferes with the lock 32 in the insertion process and hence, the lock arm 31 deflects elastically. The upper end of the engaging portion 46 contacts the stopper 29 when the clip 40 assumes a normal assembled state with respect to the mounting portion 27 and restricts further upward displacement of the clip 40. At the same time, the lock arm 31 restores elastically so that the lock 32 engages the through hole 47 to restrict downward removal (dropping) of the clip 40 with respect to the first frame 11. Accordingly, the clip 40 is locked to the first frame 11 (mounting portion 27) in an assembled state.

The clip 40 that has been assembled to the first frame 11 is mounted on the panel P. More particularly, the shaft 42 of the clip 40 is directed toward the mounting hole H and is inserted into the mounting hole H. The elastic engaging members 43 deflect elastically during the insertion process and approach the shaft 42. The elastic engaging members 43 restore elastically when the clip 40 assumes a normal assembled state on the panel P and expand to clamp the panel P between the elastically-restored elastic engaging members 43 and the elastic pushing members 45 in the plate-thickness direction. Accordingly, the clip 40 is locked to the panel P in a mounted state.

The seal functioning portion 50 of the seal ring 48 is sandwiched between the base 41 and the panel P and is collapsed elastically and deformed when the clip 40 is mounted on the panel P. Elastic restoring forces of the seal ring 48 bring the lips 51 hermetically into contact with the panel P and the base 41. Accordingly, the seal functioning portion 50 prevents any liquid that may pass through the mounting hole H from intruding into a first frame 11 (first housing 10).

The second housing 60 has a synthetic resin second frame 61, upper and lower second sub-housings 62 and female terminal fittings (not shown) of different sizes.

The second frame 61 has an approximately square shape as viewed from the front or rear. Upper and lower accommodating spaces 63 open at a rear surface of the second frame 61 and second cavities 64 open at a front surface of the second frame 61. The upper and lower accommodating spaces 63 define horizontally elongated oblong shapes and extend laterally over substantially the entire width of the second frame 61. A front wall 67 is defined at the front end of the second frame 61. Tab insertion holes 65 are formed through the front wall 67 and communicate with the accommodating spaces 63 and the second cavities 64 so that tabs can penetrate through the tab insertion holes 65. The second frame 61 has upper and lower dual walls 66 that face the upper and lower accommodating spaces 63 respectively.

The front wall 67 closes substantially all of a front end surface of the second frame 61 and an outer periphery of a front end of the second frame 61 is contiguous with the front wall 67 over the entire periphery. Accordingly, front end portions of the second frame 61 are hardly elastically deformable or displaceable in vertical or lateral directions. To the contrary, a rear end surface of the second frame 61 defines insertion openings for the male terminal fittings or for the second sub-housings 62. Accordingly, the open rear end of the second frame 61 is more elastically deformable or displaceable in vertical and lateral directions as compared to the front end portion. Elastic deformation or displacement is liable to occur in the dual-purpose walls 66 that face the laterally wide accommodating spaces 63. Here, the connections of the dual-purpose walls 66 with the front wall 67 define fulcrums so that the dual-purpose walls 66 deform or displace in a vertically inclined manner using the outer periphery of the front wall 67 as the fulcrums. Hence, a deformation amount or a displacement quantity of the dual-purpose walls 66 becomes maximum at a rear periphery of the second frame 61 (dual-purpose wall 66).

A cam follower 68 projects out from an outer surface of each dual-purpose wall 66 in upward or downward directions that intersect the fitting engagement direction of the housings 10, 60. The cam followers 68 are formed at positions slightly behind the longitudinal center of the second frame 61 and at laterally center positions of the second frame 61. The cam followers 68 engage the connections 20 of the moving plate 18 in a fitting engagement process of the housings 10, 60.

Locks 69 project from the outer surfaces of the dual-purpose walls 66 and are arranged in left-right symmetry. The locks 69 are formed near the rear end of the second frame 61 and hence are remote from the cam follower 68 in the longitudinal direction. Similarly, engaging projections 70 project from outer surfaces of the left and right side walls of the second frame 61. The engaging projections 70 are formed on the rear end of the second frame 61 with respect to the longitudinal direction and are in central positions with respect to the vertical direction.

A frontward-movement preventing rib 71 extends in the circumferential direction on an outer periphery of the second frame 61 to enable the removal of a mold in the longitudinal direction when forming the second frame 61 using the mold. The frontward-movement preventing rib 71 is not formed in regions of the cam followers 68, the lock projections 69 and the engaging projections 70.

The female terminal fitting is of a well-known shape and has a quadrangular tubular portion on a front end and an electric wire connecting portion on a rear end. A tab of the female terminal fitting is inserted into the quadrangular tubular portion and contacts an elastic contact member inside of the quadrangular tubular portion when the housings 10, 60 are connected with each other. The female terminal fitting is inserted into the second cavity 64 and, at the same time, is inserted into the second sub-housing 62. The female terminal fittings are arranged in point symmetry in the second housing 60 with respect to an axis of symmetry (not shown) and extend longitudinally along the fitting engagement direction of the housings 10, 60.

The second sub housing 62 has a flat shape, and defines an oblong when viewed from the front or rear. The female terminal fittings are inserted into the second sub-housing 62 from the rear, and electric wires 72 connected to the female terminal fittings are led out to the rear. A sealing groove 73 is formed on an outer periphery of the second sub-housing 62, and ring-shaped sealing members 74 are mounted on the sealing groove 73.

The second sub-housing 62 is inserted into the accommodating space 63 from the rear until a front end of the second sub-housing 62 contacts the front wall 67 of the accommodating space 63 to prevent further frontward movement of the second sub-housing 62. Removal of the second sub-housing 62 is prevented by a stop engagement action of a reinforcement 87 of a restricting member 80 described later. A rear end surface of the second sub housing 62 becomes coplanar with a rear end surface of the second frame 61. Outer peripheries of the sealing members 74 closely contact an inner peripheral surface of the accommodating space 63 and, at the same time, inner peripheral surfaces of the sealing members 74 closely contact a bottom surface of the sealing groove 73. Accordingly, hermetic sealing is acquired between the outer periphery of the second sub-housing 62 and the inner periphery of the accommodating space 63.

The dual-purpose walls 66 form a flat upper inner surface of the upper accommodating space 63 and a flat lower inner surface of the lower accommodating space 63. The upper dual-purpose wall 66 directly contacts laterally extending upper straight portions of the sealing members 74 accommodated in the upper accommodating space 63 from above, and the lower dual-purpose wall 66 direct contacts laterally extending lower straight portions of the sealing members 74 accommodated in the lower accommodating space 63 from below.

The restricting member 80 is mounted on the second frame 61. The restricting member 80 is made of a synthetic resin and has an approximately square frame shape as viewed in the longitudinal direction, and has a point symmetrical shape with respect to an axis of symmetry (not shown) in the longitudinal fitting engagement direction of the housings 10, 60. The restricting member 80 has an upper plate 81, a lower plate 82 and left and right side plates 83L, 83R. The restricting member 80 is assembled from the rear to surround an outer periphery of an opening peripheral portion at a rear end of the second frame 61 and is dimensioned so that there is no play between the restricting member 80 and the second frame 61 in the vertical and lateral directions.

Two locks 84 are cantilevered forwardly on each of the upper and lower plates 81 and 82 of the restricting member 80 and are disposed in left-right symmetry. The locks 84 are elastically deflectable in the vertical direction, which intersects with the assembling direction of the restricting member 80 to the second frame 61. A lock hole 85 vertically penetrates each lock 84. Similarly, engaging holes 86 laterally penetrate the left and right side plates 83L, 83R in the lateral direction. When the restricting member 80 is viewed the rear, the engaging hole 86 in the right sideplate 83R is at a position slightly below the vertical center of the right side plate 83R, and the engaging hole 86 in the left side plate 83L is at a position slightly above the vertical center of the left side plate 83L.

The lock holes 85 engage the lock projections 69 and, simultaneously, the engaging holes 86 engage the engaging projections 70 when the restricting member 80 is assembled to the second frame 61 to restrict rearward removal of the restricting member 80 from the second frame 61. Further, the restricting member 80 contacts the front-movement preventing portion 71 from behind to prevent frontward movement of the restricting member 80 relative to the second frame 61. Accordingly, the restricting member 80 is locked in a state where the longitudinal displacement of the restricting member 80 relative to the second frame 61 is restricted.

As shown in FIG. 9, upper and lower reinforcements 87 are formed on the restricting member 80. The reinforcements 87 define plates that extend in from a periphery of the rear end of the restricting member 80. FIG. 9 is a front view of the restricting member 80. The lateral direction of the restricting member 80 is determined when viewed from the rear. Thus, the left and right directions are reversed in FIG. 9. The upper reinforcement 87 has a first, second and third plates 88, 89 and 90. The first plate 88 extends laterally along the upper plate 81 in a strip shape and has a fixed height over the whole length thereof. The second plate 89 is contiguous with a left end of the first plate 88, is arranged along an upper end of the left side plate portion 83L, and has an approximately triangular shape. A lower end portion of the second plate portion 89 is formed contiguously with a region of the left side plate 83L where the engaging hole 86 is formed. The third plate 90 is contiguous with a right end portion of the first plate 88, is arranged along an upper end portion of the right side plate 83R, and has an approximately vertically-elongated triangular shape.

The lower reinforcement 87 is similar to the upper reinforcement 87 and has first, second and third plates 88, 89 and 90. the lower reinforcement 87 is arranged in point symmetry with the upper reinforcement 87 with respect to the shape and the arrangement. More particularly, the first plate 88 extends laterally along the lower plate 82 in a strip shape and has a fixed height over the whole length thereof. The second plate 89 is contiguous with a right end of the first plate 88, is arranged along a lower end portion of the right side plate 83R, and has an approximately triangular shape. An upper end portion of the second plate 89 is contiguous with a region of the right side plate 83R where the engaging hole 86 is formed. The third plate 90 is contiguous with a left end of the first plate 88, is arranged along a lower end portion of the left side plate 83L, and has an approximately vertically-elongated triangular shape.

The reinforcements 87 contact the rear end surface of the second frame 61 and the rear end surface of the second sub-housings 62 when the restricting member 80 is assembled to the second frame 61. A force may be exerted that attempts to displace the second sub-housings 62 in the rearward direction relative to the second frame 61. However, the rear end surfaces of the second sub-housings 62 contact the reinforcements 87 and hence, the rearward displacement of the second sub housings 62 relative to the second frame 61 (i.e., the removal of the second sub-housings 62 from the accommodating space 63) is restricted. Thus, the reinforcements 87 also function as removal preventing for restricting removal of the second sub-housings 62.

The housings 10, 60 are connected by initially fitting the second housing 60 slightly into the hood 13 of the first housing 10 while the lever 22 is at an initial position. Thus, the cam followers 68 engage the connections 20 of the moving plate 18 and, simultaneously, the cam followers 68 and the connections 20 enter the cam grooves 26. The lever 22 then is rotated toward a fitting engagement position so that the housings 10, 60 are pulled together by a cam action (toggle action) between the cam grooves 26, the cam followers 68 and the connections 20. The housings 10, 60 reach a normal fitting-engagement state when the lever 22 reaches the fitting engagement position and, at the same time, the tabs of the male and female terminal fittings are connected together in an electrically conductive manner.

A fitting engagement resistance is generated between the housings 10, 60 while rotating the lever 22 from the initial position to the fitting engagement position due to a slide resistance between the male and female terminal fittings. This fitting engagement resistance acts urges the cam follower 68 toward a cam groove 26 side and can displace the dual-purpose walls 66 on which the cam followers 68 are formed. Thus, the dual-purpose walls 66 are urged in an expanding manner toward an outer surface side (up in case of the upper dual-purpose wall 66 and down in the case of the lower dual-purpose wall 66). As a result, there exists a possibility that a close contacting force between the sealing member 74 and an inner surface of the dual-purpose wall 66 is lowered, thus lowering a waterproof performance between the sealing member 74 and the dual-purpose wall 66.

To avoid the above-described problem, the connector of the invention has the frame-shaped restricting member 80 fit on the rear end portion of the second frame 61. A force may attempt to deform the dual-purpose walls 66 vertically. However, the frame-shaped restricting member 80 is fit on the second frame 61, including the dual-purpose walls 66, and restricts displacement of the dual-purpose walls 66 attributed to expansion. Accordingly, a waterproof performance (sealing performance) between the sealing member 74 and the inner surface of the dual-purpose wall 66 is not lowered.

A force may attempt to displace the arms 24 of the lever 22 outwardly due to the slide resistance between the cam grooves 26 on the arms 24 and the cam follower 68. An external force that attempts to displace the cam follower 68 outwardly along with the displacement of the arm 24 acts on the cam follower 68. The external force acting on the cam follower 68 becomes a force for displacing the dual-purpose walls 66 outwardly. However, the expansion restricting wall 15 is formed on the first housing 10 and restricts outward displacement of the arms 24. Accordingly, outward displacement of the arms 24 is restricted and outward displacement of the dual-purpose walls 66 assuredly is restricted.

A force may attempt to displace the dual-purpose walls 66 outward. The restricting member 80 will deform if the rigidity of the restricting member 80 is weaker than such a force on the dual-purpose walls 66, and in this situation, the dual-purpose walls 66 will displace outwardly. However, the reinforcements 87 are formed on the restricting member 80 to suppress such displacement. The reinforcements 87 enhance the strength (rigidity) of the restricting member 80 and hence restrict the outward deformation of the restricting member 80. Accordingly, the dual-purpose walls 66 will not displace outwardly.

When the dual-purpose walls 66 are displaced outwardly, a maximum displacement occurs at the rear opening end of the second frame 61. However, the restricting member 80 is arranged along the opening periphery of the second frame 61 to prevent displacement of the dual-purpose walls 66.

The invention is not limited to the above described and illustrated embodiment. For example, the following embodiments are also embraced by the technical scope of the invention as defined by the claims.

The first housing is a male-type housing and the second housing is a female-type housing in the above-described embodiment. However, the first housing may be a female-type housing and the second housing may be a male-type housing.

The lever is formed with two arms that extend from ends of the manipulation part in the above-described embodiment. However, the lever may be one plate.

The expansion restricting wall for restricting outward displacement of the lever toward is formed on the first housing in the above-described embodiment. However, such an expansion restricting wall may not be formed on the first housing.

Reinforcements project in on the restricting member in the above-described embodiment. However, such reinforcements may not be formed on the restricting members.

Although the restricting member is arranged on the opening periphery of the frame in the above-described embodiment, the restricting member may be arranged at a position closer to (in front of) the cam follower than the opening periphery of the frame.

Removal of the sub-housing is prevented by the removal preventing portion (reinforcement) on the restricting member in the above-described embodiment. However, removal of the sub-housing may be restricted using a different engaging means.

The reinforcement also functions as the removal preventing portion in the above-described embodiment. However, a dedicated removal preventing portion may be formed in addition to the reinforcement.

Although the male terminal fittings are arranged in point symmetry with respect to the axis of symmetry in the fitting engagement direction of both housings in the above-described embodiment, the male terminal fittings may be arranged in an asymmetrical manner.

Although the female terminal fittings are arranged in point symmetry with respect to the axis of symmetry in the fitting engagement direction of both housings in the above-described embodiment, the female terminal fittings may be arranged in an asymmetrical manner.

The restricting member is point symmetrical with respect to the axis of symmetry of the fitting engagement direction in the illustrated embodiment, but the restricting member may be asymmetrical.

The reinforcement projects toward the inner peripheral side of the restricting member in the above-described embodiment, but the reinforcement may project toward the outer peripheral side.

What is claimed is:

1. A connector comprising:
   a first housing;
   a lever rotatably mounted on the first housing and formed with a cam; and
   a second housing connectable with the first housing, the second housing including a frame, at least one accommodating space formed in the frame, at least one sub-housing accommodated in the respective accommodating space, at least one dual-purpose wall facing the accommodating space, at least one cam follower projecting out on an outer surface of the dual-purpose wall, the first and second housings being connectable by a cam action caused by engagement of the cam and the cam follower while rotating the lever;
   a ring-shaped sealing member provided between an outer periphery of the sub-housing and an inner periphery of the accommodating space; and
   a frame-shaped restricting member assembled to the frame, the frame-shaped restricting member surrounding the frame and restricting outward displacement of the dual-purpose wall.

2. The connector of claim 1, wherein an expansion restricting wall is formed on the first housing and is configured to restrict outward displacement of the lever.

3. The connector of claim 1, wherein the restricting member is arranged at an opening end of the frame.

4. The connector of claim 1, wherein a removal preventing portion is formed on the restricting member and is configured to engage the sub-housing accommodated in the accommodating space and restrict removal of the sub-housing from the accommodating space.

5. The connector of claim 1, further comprising a clip connected to the first housing and configured for mounting the first housing to a panel.

6. The connector of claim 1, wherein a reinforcement projects in on the restricting member.

7. The connector of claim 6, wherein the reinforcement projects sufficiently in on the restricting member to engage the sub-housing and prevent removal of the sub-housing from the accommodating space.

8. The connector of claim 7, wherein the restricting member is locked to the frame.

9. The connector of claim 1, wherein the at least one accommodating space comprises two accommodating space formed in the frame, the at least one sub-housing comprises two sub-housings accommodated in the respective accommodating spaces, the at least one dual-purpose wall comprises two dual-purpose walls facing the respective accommodating spaces, the at least one cam follower comprises two cam followers projecting out on outer surfaces of the respective dual-purpose walls.

10. The connector of claim 9, wherein the frame-shaped restricting member assembled to the frame is disposed outwardly of the dual-purpose walls and restricts outward displacement of the dual-purpose walls.

11. A connector comprising:
    a first housing;
    a lever rotatably mounted on the first housing and formed with a cam; and
    a second housing connectable with the first housing, the second housing including a frame, accommodating spaces formed in the frame, sub-housings accommodated in the respective accommodating spaces, dual-purpose walls facing the accommodating spaces, cam followers projecting out on outer surfaces of the dual-purpose walls, the first and second housings being connectable by a cam action caused by engagement of the cam and the cam follower while moving the lever;
    ring-shaped seals between outer peripheries of the sub-housings and inner peripheries of the accommodating spaces; and
    a frame-shaped restricting member assembled around the frame and restricting outward displacement of the dual-purpose walls.

12. The connector of claim 11, wherein an expansion restricting wall is formed on the first housing and is configured to restrict outward displacement of the lever.

13. The connector of claim 11, wherein the restricting member is arranged at an opening end of the frame.

14. The connector of claim 11, wherein reinforcements project in on the restricting member.

15. The connector of claim 14, wherein the reinforcements project sufficiently in on the restricting member to engage the sub-housings and prevent removal of the sub-housings from the accommodating space.

16. The connector of claim 15, wherein the restricting member is locked to the frame.

* * * * *